Patented Feb. 21, 1950

2,498,430

UNITED STATES PATENT OFFICE 2,498,430

1-METHYL-4-p-METHOXYPHENYL-4-PROPIONOXY-PIPERIDINE HYDROCHLORIDE

John Lee, Essex Fells, N. J., assignor to Hoffmann-La Roche, Inc., Nutley, N. J., a corporation of New Jersey No Drawing. Application May 21, 1945, Serial No. 595,061

1 Claim. (Cl. 260—294)

This invention relates to N-tertiary-4-C-homocyclyl-4-acyloxy-piperidines, wherein the homocyclyl group is substituted, and process for making them. These compounds, as far as I know, are new and they correspond to the general formula

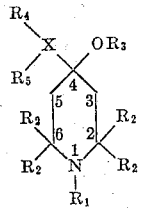

wherein X is a C-homocyclyl radical, $R_1$ may be a hydrocarbon substituent such as an alkyl, hydroxyalkyl, alkylene, cycloalkyl, arylalkyl, or aryl radical, $R_2$ is hydrogen or alkyl, $R_3$ is an acyl radical, $R_4$ is hydrogen or a group free of active hydrogen atoms such as alkyl, alkoxy, nitro, dimethylamino, or halogen, which may be attached in ortho, meta, or para positions of X, and $R_5$ is alkyl, alkoxy, aralkoxy, nitro, or halogen, or $R_4$ and $R_5$ together form a methylene dioxy or oxydimethylene group.

Such compounds are, for example:

1 - methyl - 4 - (3,4 - methylenedioxy) - 4 - propionoxy-piperidine
1 - methyl - 4 - p - methoxyphenyl - 4 - succinoxy-piperidine
1 - methyl - 4 - p - methoxyphenyl - 4 - carbethoxy-piperidine
1 - methyl - 4 - p - methoxyphenyl - 4 - acetoxy - piperidine
1,2,2,6,6 - pentamethyl - 4 - p - methoxyphenyl - 4-propionoxy-piperidine
1 - methyl - 4 - p - methoxyphenyl - 4 - dimethylcarbamoxy-piperidine
1 - methyl - 4 - p - benzyloxyphenyl - 4 - propionoxy-piperidine
1 - methyl - 4 - p - methoxyphenyl - 4 - benzoxy - piperidine
1 - methyl - 4 - p - methoxyphenyl - 4 - dimethylacroxy-piperidine
1 - methyl - 4 - p - methoxyphenyl - 4 - furfuroxy-piperidine
1 - methyl - 4 - p - tolyl - 4 - propionoxy - piperidine
1 - methyl - 4 - (6 - methoxynaphthyl - 2) - 4 - propionoxy - piperidine
1 - methyl - 4 - p - methylcylohexyl - 4 - propionoxy - piperidine
1 - methyl - 4 - o - methoxyphenyl - 4 - propionoxy-piperidine
1 - 4 - m - methoxyphenyl - 4 - propionoxy - piperidine including the corresponding homologous 1-ethyl, 1-butyl, 1-propyl, and 1-isopropyl compounds; and 1 - benzyl - 4 - p - methoxyphenyl - propionoxy - piperidine
1 - cyclohexyl - 4 - p - methoxyphenyl - 4 - propionoxy-piperidine
1 - phenyl - 4 - p - methoxyphenyl - 4 - propionoxy-piperidine
1 - allyl - 4 - p - methoxyphenyl - 4 - propionoxy-piperidine
1 - butyl - 4 - o - dimethylaminophenyl - 4 - propionoxy-piperidine
1 - butyl - 4 - p - chlorophenyl - 4 - propionoxy - piperidine and the salts of all of these compounds. Such salts may be those of organic or inorganic acids as for example tartrates, malates, citrates, ethanesulfonates, isethionates, sulfates, hydrochlorides, and the like.

I have found that these compounds can be prepared by reacting the corresponding N-tertiary-4-C-homocyclyl-4-piperidinols described and claimed in my copending application, Serial No. 585,795, filed March 30, 1945, now abandoned, with acyl halides or acyl anhydrides in the usual manner, for example, the piperidinols may be dissolved in the acid anhydride, a small proportion of sulphuric acid or anhydrous sodium acetate added with the mixture refluxed. The reaction mixture is decomposed with water and the product isolated by alkalinization and extraction with a water-immiscible solvent. The acylation may also be conducted by means of an acid anhydride or an acid chloride in pyridine solution and the reaction product isolated in the usual manner.

I may alternatively prepare these compounds by direct acylation of the Grignard complex according to the following reaction scheme:

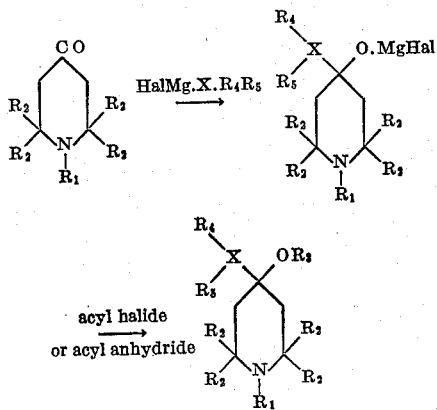

wherein $R_1$, $R_2$, $R_3$, $R_4$, $R_5$, and X have the above indicated meanings and Hal stands for halogen.

The reaction product is treated with an aqueous acidic solution such as of ammonium chloride, dilute hydrochloric acid and the like, the neutral products, if any, removed by extraction of the acid solution with a water immiscible organic solvent, the aqueous phase made alkaline and the basic compounds extracted with a solvent such as benzol or ether. This can be then transformed into a salt in the usual manner.

The esters when obtained from optically inactive piperidinols or directly from a Grignard complex may be resolved into the optically active components by the use of optically active acids such as, for example, malic acids, tartaric acids, dibenzoyltartaric acids, and ditoluyltartaric acids.

The compounds of my invention are characterized by analgesic action. I have found that substitution in the homocyclic group produces compounds which are characterized by a lesser toxicity than those compounds wherein the homocyclic group is unsubstituted. For example, I find 1-methyl-4-phenyl-4-propionoxy-piperidine hydrochloride to be toxic in mice, at a dose of 40 mg. per kilo, whereas the corresponding 1-methyl-4-p-methoxyphenyl-4-propionoxy piperidine hydrochloride while still retaining a powerful analgesic activity has a minimum lethal dose of 400 mg.

The following examples illustrate my invention:

Example 1

1.0 g. of 1-methyl-4-p-methoxyphenyl-4-hydroxypiperidine is dissolved in 5 cc. of pyridine and 0.7 g. of propionic anhydride added. The mixture is allowed to stand overnight at room temperature, the pyridine removed by distillation in vacuum, the residue taken up in water and basified with potassium carbonate, and the liberated base extracted with ether. The ether solution is filtered off and hydrochloric acid gas passed in. The hydrochloride of 1-methyl-4-propionoxy-4-p-methoxyphenyl-piperidine, melting at 116° C. is thus obtained.

Example 2

0.5 g. of 1-ethyl-4-p-methoxyphenyl-4-piperidinol is dissolved in 50 cc. of dry acetone and 0.3 g. of propionyl chloride is added. The mixture is refluxed for 3 hours, the acetone solution concentrated to a small volume, and cooled. 1-ethyl-4-p-methoxphenyl-4-propoxy-piperidine hydrochloride, M. P. 164° C. crystallizes out.

Example 3

1 g. of 1-butyl-4-p-tolyl-4-piperidinol is dissolved in 5 cc. of propionic anhydride and 0.01 g. of concentrated sulfuric acid added. The mixture is heated on the steam bath for 2 hours and the excess propionic anhydride is removed by distillation in vacuo. The residual material is poured into water, saturated with potassium carbonate, and extracted with ether. The ether solution is dried and hydrochloric acid gas is passed into the solution. 1-butyl-4-p-tolyl-4-propoxy-piperidine hydrochloride, M. P. 196° C., separates out.

Example 4

30 g. of p-bromotoluene are transformed into the corresponding Grignard reagent by reacting with 4.2 g. of magnesium in 200 cc. of ether in the usual maner. The flask is then cooled and a solution of 27.2 g. of 1-butyl-4-piperidone is added dropwise. The solid complex precipitates and the mixture is stirred with refluxing for 2 hours. This is then cooled and 25 g. of propionic anhydride is added dropwise. The mixture is stirred for 4 hours, poured into water, and made acid to Congo paper with hydrochloric acid. The ethereal solution is discarded, the aqueous solution basified, and extracted with ether. The ether solution is dried over potassium carbonate for 24 hours, hydrochloric acid gas passed in, and the hydrochloride of 1-butyl-4-p-tolyl-4-propoxy-piperidine precipitates. On recrystalizing from acetone the product melts at 196° C.

What I claim is:

1 - methyl - 4 - p - methoxyphenyl - 4 - propionoxy-piperidine hydrochloride.

JOHN LEE.

REFERENCES CITED

The following references are of record in the file of this patent:

UNITED STATES PATENTS

| Number | Name | Date |
| --- | --- | --- |
| 2,411,664 | Miescher et al. | Nov. 26, 1946 |
| 2,441,069 | Hoffmann et al. | May 4, 1948 |

FOREIGN PATENTS

| Number | Country | Date |
| --- | --- | --- |
| 60,592 | Denmark | Feb. 1, 1943 |

OTHER REFERENCES

Gilman: Organic Chemistry, Wiley & Sons, N. Y., 1938, p. 430 and 580.

Jensen et al, Dansk Tiddskrift for Farmaci, vol. 17, (1943), pages 173–182.